United States Patent
Austin

(10) Patent No.: US 6,712,378 B1
(45) Date of Patent: Mar. 30, 2004

(54) MAGNETIC, TELESCOPING TRAILER HITCH ALIGNMENT DEVICE

(76) Inventor: Ronald J. Austin, 320 N. Tennessee St., Graham, TX (US) 76450

( * ) Notice: Subject to any disclaimer, the term of this patent is extended or adjusted under 35 U.S.C. 154(b) by 340 days.

(21) Appl. No.: 09/692,431

(22) Filed: Oct. 19, 2000

(51) Int. Cl.⁷ .................................................. B60D 1/40
(52) U.S. Cl. ...................................................... 280/477
(58) Field of Search .............................. 280/477; 33/264

(56) References Cited

U.S. PATENT DOCUMENTS

| | | | |
|---|---|---|---|
| 4,192,526 A | 3/1980 | Myers | |
| 4,285,138 A | 8/1981 | Berry | |
| 4,905,376 A | 3/1990 | Neeley | |
| 4,988,116 A | 1/1991 | Evertsen | |
| 5,035,441 A | * 7/1991 | Murray | 280/477 |
| 5,113,588 A | * 5/1992 | Walston | 33/264 |
| 5,269,554 A | * 12/1993 | Law et al. | 280/477 |
| 5,558,352 A | * 9/1996 | Mills | 280/477 |
| 5,669,621 A | 9/1997 | Lockwood | |
| 5,821,852 A | 10/1998 | Fairchild | |
| 5,861,814 A | 1/1999 | Clayton | |
| 6,139,041 A | * 10/2000 | Murphy | 280/477 |
| 6,168,181 B1 | * 1/2001 | Gadd | 280/477 |

* cited by examiner

*Primary Examiner*—Lesley D. Morris
*Assistant Examiner*—L. Lum
(74) *Attorney, Agent, or Firm*—John D. Gugliotta

(57) ABSTRACT

A trailer hitch alignment device is provided having a hitch alignment guide and a ball target mast. The hitch alignment guide has a vertically disposed, elongated alignment mast affixed to a magnetic, disc shaped hitch base. The ball target mast is composed of a vertically disposed, elongated alignment mast affixed to a magnetic, ring shaped ball base. The masts are telescoping shafts having linearly spaced alignment indicia are provided in a linearly spaced manner along the upper portion of the shafts.

7 Claims, 4 Drawing Sheets

MAGNETIC, TELESCOPING TRAILER HITCH ALIGNMENT DEVICE

RELATED APPLICATIONS

The present invention was first described in Disclosure Document No. 472,299, filed on Apr. 10, 2000. There are no previously filed, nor currently any co-pending applications, anywhere in the world.

BACKGROUND OF THE INVENTION

1. Field of the Invention

The present invention relates generally to automotive accessories and, more particularly, to accessories for facilitating the alignment of the hitches of a towing vehicle and a towed vehicle.

2. Description of the Related Art

One of the most frustrating and difficult tasks for the driver of a motor vehicle to perform is to align/couple the trailer hitch of a towing vehicle with that of a trailer. The reason for the difficulty is the fact that the respective trailer hitches are out of the sight of the driver. Therefore, it was traditionally necessary to have a second person direct the driver into alignment with the towing vehicle. Otherwise, if the driver attempted such a task alone, the driver would have to repeatedly exit the vehicle and walk around to the rear of the vehicle to determine the relative locations of the hitches. Aside from the obvious difficulties and frustrations associated with aligning the hitches, there is also the risk of vehicle damage caused by the driver misjudging the distances required to couple, thus colliding the towing vehicle with the trailer.

A number of hitch alignment devices have been devised which attempt to solve the problems discussed herein. A search of the prior art did not disclose any patents that read directly on the claims of the instant invention; however, the following references were considered related.

The following patents disclose a fixed sight member magnetically attached to the towing vehicle to facilitate a trailer hitch:

U.S. Pat. No. 5,669,621 issued in the name of Lockwood

U.S. Pat. No. 4,285,138 issued in the name of Berry

U.S. Pat. No. 4,192,526 issued in the name of Myers

U.S. Pat. No. 5,861,814 issued in the name of Clayton describes a trailer hitch with magnetic sensor system.

U.S. Pat. No. 5,821,852 issued in the name of Fairchild discloses a trailer hitch alignment device with a pulley magnetically mounted to the trailer hitch.

U.S. Pat. No. 5,558,352 issued in the name of Mills describes a trailer hitch alignment device utilizing masts with several magnets.

U.S. Pat. No. 4,988,116 issued in the name of Evertsen discloses a trailer hitch positioning aid having a magnetic switching unit.

And, U.S. Pat. No. 4,905,376 issued in the name of Neeley describes a magnetic mirror mount for facilitating a trailer hitch alignment.

In spite of these attempts, many impediments remain to a commercially available device for use in non-commercial applications. For example, such a device should be easily mountable and dismountable, vertically adjustable, structurally rigid, mechanically stable, and above all simple and economical to manufacture. Use of electronics, either audio or visual, result in an impractical product for the non-commercial market.

Consequently, a need has been felt for providing an apparatus and method which allow for the use of magnetically affixed, telescoping poles having a linear alignment of measuring indices.

SUMMARY OF THE INVENTION

Therefore, it is an object of the invention to provide for a device for aiding in the alignment and coupling of the towing hitches of a towing vehicle and its trailer.

It is a feature of the present invention to provides a user with the means to individually align the respective hitches through a simple and comprehensive design which is compatible with a great variety of vehicles and hitch types.

Briefly described according to the preferred embodiment, the present invention essentially provides a driver of a towing vehicle with the visual reference points to individually align the towing hitches of a vehicle and its trailer. The invention accomplishes this task with the use of two masts, one for mounting to the hitch of the towing vehicle, and one for mounting to the hitch of the trailer. Each mast is comprised of at least two sections which attach together to form a single mast. This provides for ease of storage of the device when desired.

Preferably, at the top of each mast is a series of linearly aligned spacing indicia, used to aid in determining not only alignment, but also relative distance between the trailer ball and trailer hitch.

An advantage of the present invention is that is provides a trailer hitch alignment device that is easily mountable and dismountable to most any conventional trailer hitch device.

Another advantage of the present invention is that it is vertically adjustable, allowing for universal use for a variety of sized vehicles and trailers.

Yet another advantage of the present invention is that it is structurally rigid, allowing for straightforward direction of the hitch to be aligned.

Still another advantage of the present invention is that it is mechanically stable, allowing easy use free of breakage an failures that can result from whether, complicated componentry, and the like.

Still yet another advantage of the present invention is that it is simple and economical to manufacture, utilizing a minimum number of different components that are all easily made, procured, formed, or assembled.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4b is a cross sectional elevational view taken along line IV—IV of FIG. 4a;

DESCRIPTION OF THE PREFERRED EMBODIMENTS

1. Detailed Description of the Figures

Figure 1:
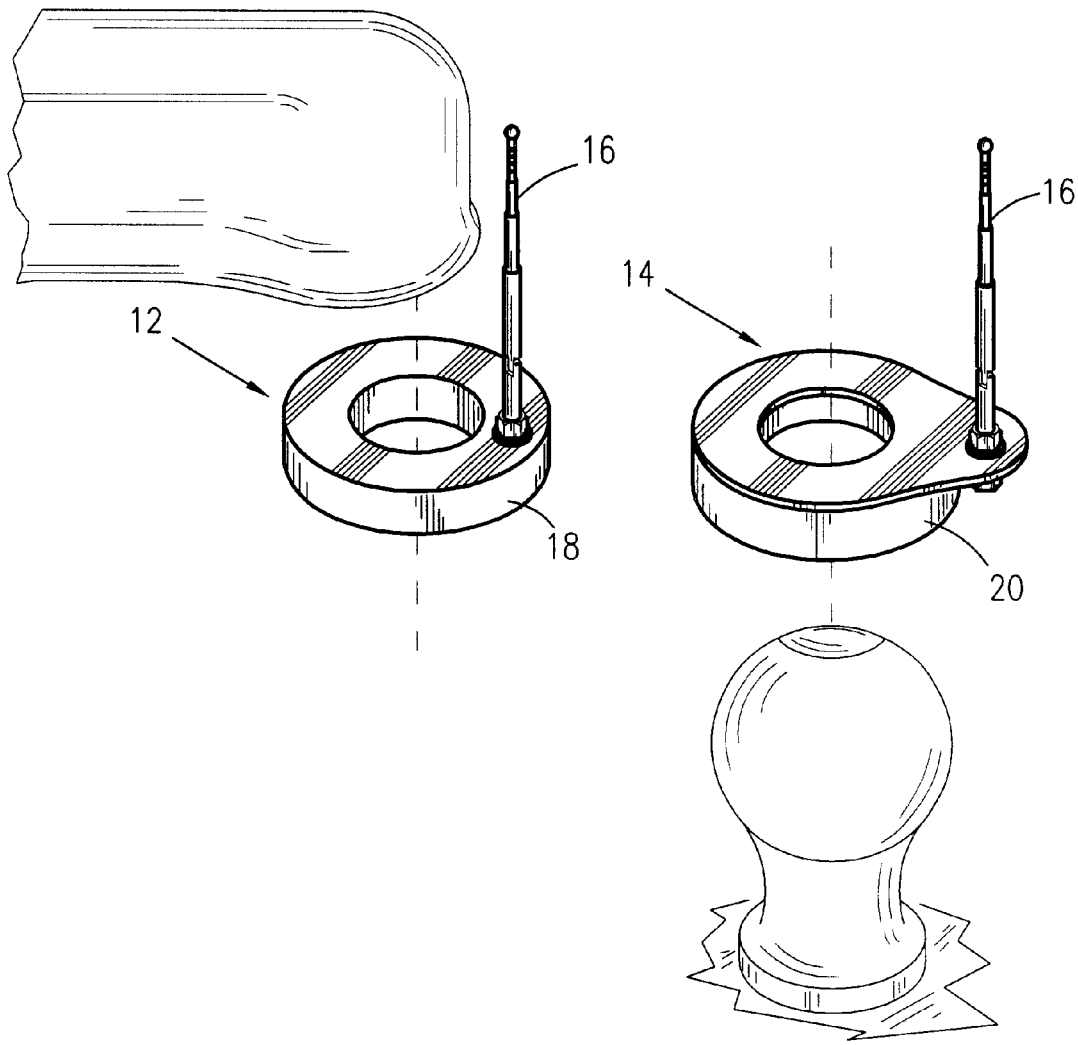
FIG. 1 is a perspective view of a trailer hitch alignment device according to the preferred embodiment of the invention, showing the major components of the invention and their relation to each other.
Figure 2:
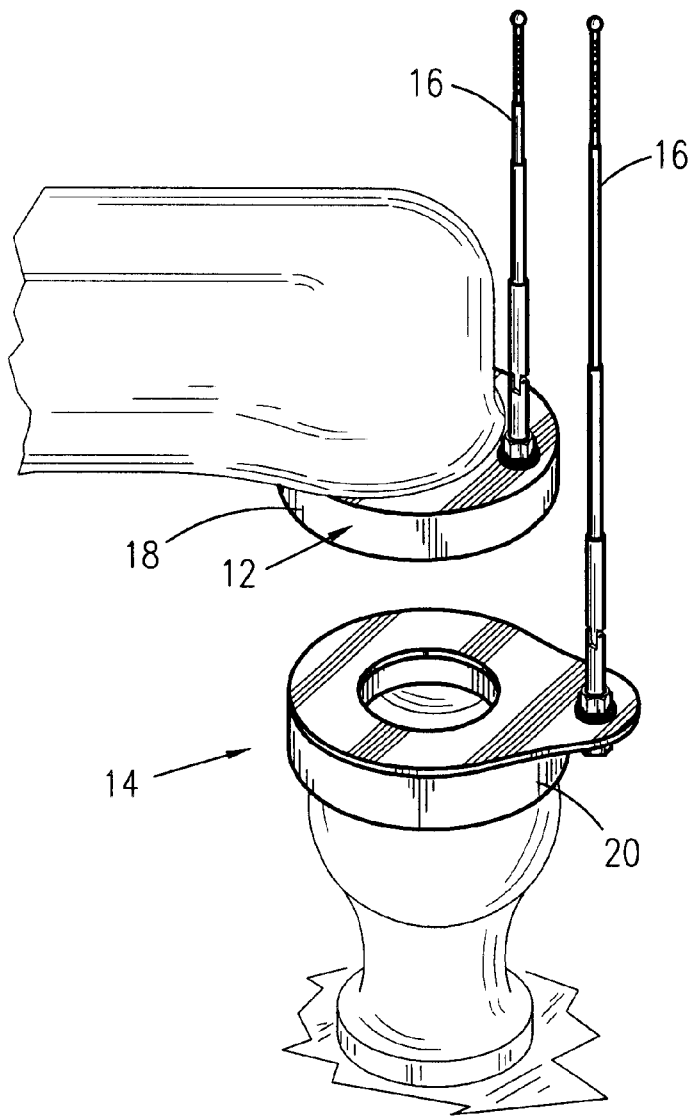
FIG. 2 is a side elevational view thereof.

Referring now to the FIGS. 1–2, a trailer hitch alignment device, generally noted as 10, is shown according to the preferred embodiment of the present invention. The device 10 is generally comprised of a hitch alignment guide 12 and a ball target mast 14. The hitch alignment guide 12 is comprised of a vertically disposed, elongated alignment mast 16 affixed to a hitch base 18. The ball target mast 13 is composed of a vertically disposed, elongated alignment mast 16 affixed to a ball base 20.

Figure 3:
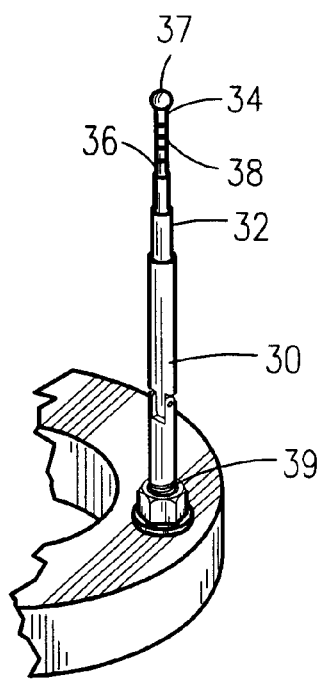
FIG. 3 is a partial detailed perspective view of a mast assembly for use therewith.

Referring now to FIG. 3, the commonly used alignment mast 16 is shown in greater detail. A lower base mast 30 is shown in the preferred embodiment as a generally tubular, linearly elongated cylinder tapering in width slightly from the bottom to the top and forming an upper mast receiving conduit 32 within. However, it is envisioned that within the teachings of the present invention the lower base mast 30 could just as easily be formed in multiple, nested and telescoping sections. An upper telescoping mast 34 is slidably accommodated within the upper mast receiving conduit 32, and allows for the upper telescoping mast 34 to be adjusted vertically relative to the lower base mast 30. It is felt that frictional mechanical contact would allow for sufficient placement and positioning of the upper telescoping mast; however, additional securing means could be added without detracting from the invention's functionality. Along the upper shaft 36 of the upper telescoping mast 34 are a series of spacing indicia 38. The spacing indicia 38 are envisioned as equally spaced, easily identified scores or imprints that will allow for determination of relative lateral positioning as will be described below. The spacing indicia 38 can also be brightly colored, flourescent or luminescent to aid in there identification and tracking. In any configuration, the spacing indicia 38 are equally spaced apart along the outer surface of the shaft 36.

At the top-most end of the upper telescoping mast 34 is a terminating indicia 37. The terminating indicia 37 is envisioned as a ball, flag, or similar marker that will allow for determination of relative lateral positioning and alignment as will be described below.

At the bottom-most end of the lower base mast 30 is a connection end 39. Envisioned and shown herein as a treaded attachment, the lower base mast 30 can be threadingly connected to either a hitch base 18 or ball base 20, as described in greater detail below.

Figure 4A:
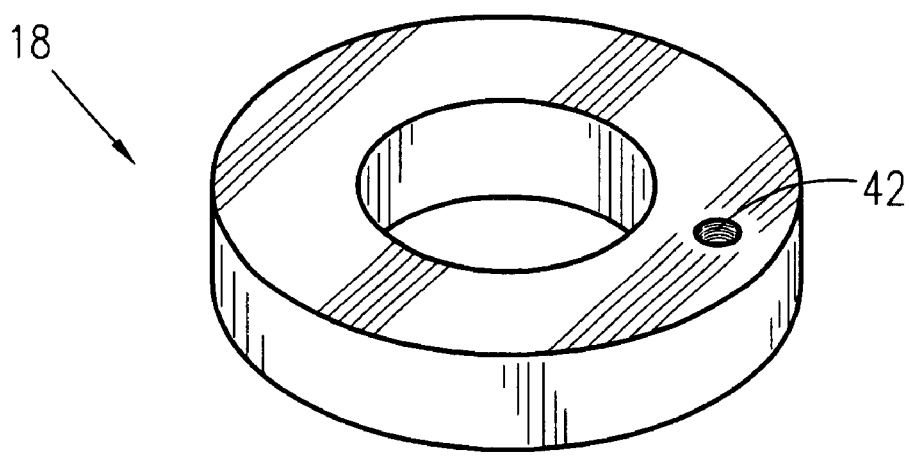
FIG. 4a is a partial perspective view of the hitch mounting base for the mast to be attached to the hitch of a trailer.
Figure 4B:
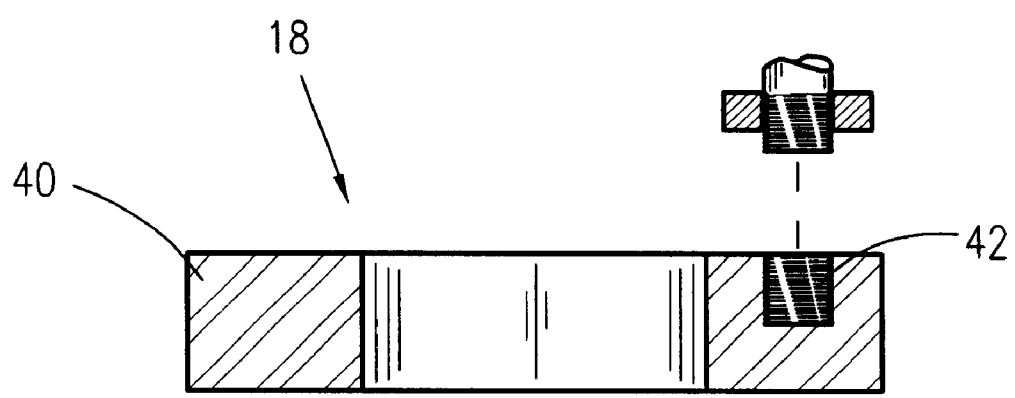

Referring now to FIGS. 4a and 4b, hitch base 18 is shown in greater detail. A sturdy magnetic disc 40 forms the main body of the hitch base 18. In this manner, the hitch base 18 can be placed upside down under a steel trailer hitch. The magnetic attraction allows a trailer hitch alignment device that is easily mountable and dismountable to most any conventional trailer hitch devices, is structurally rigid, allowing for straightforward or sideways direction of the hitch to be aligned, and is mechanically stable, allowing easy use free of breakage an failures that can result from weather and the like. A first mast receiving cavity 42 is formed within the disc 40 nearer the outer perimeter at an offset from the center of the disc 40. The cavity 42 is tapped and female-threaded for threadingly mating with the lower base mast 30, allowing for a screw-type connection for a firm, mechanical fit and assembly.

Figure 5A:
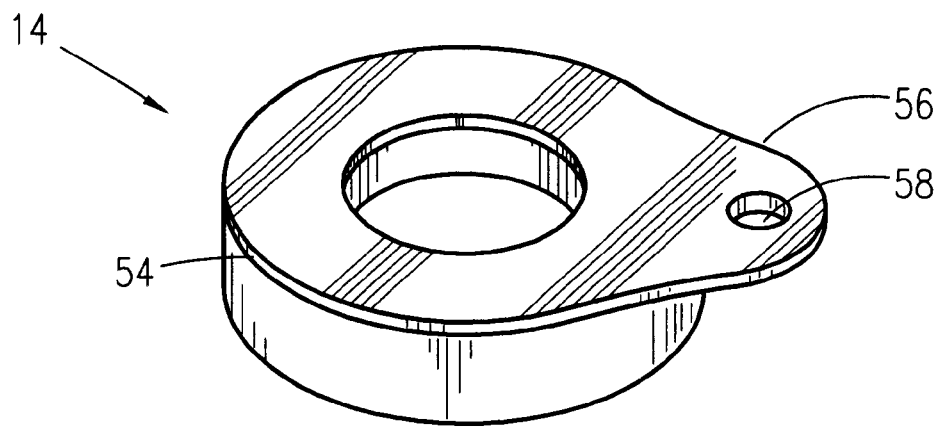
FIG. 5a is a partial perspective view of the ball mounting base for the mast to be attached to the hitch ball of a pulling vehicle.
Figure 5B:
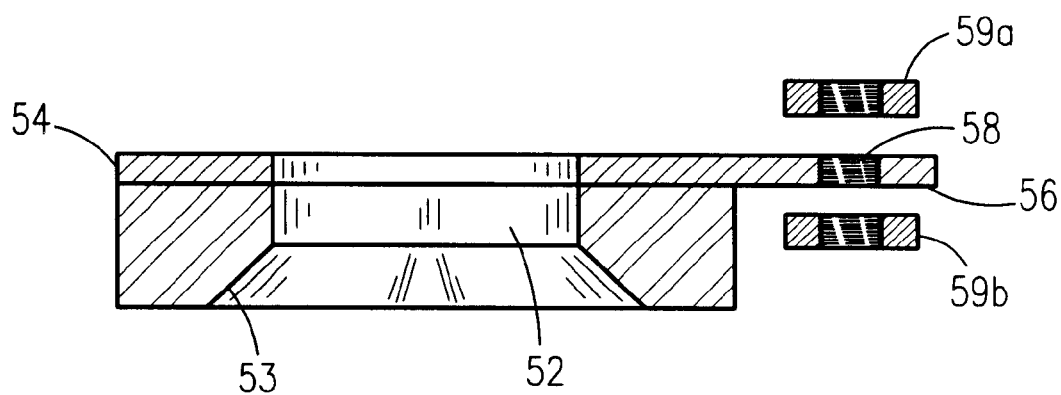
FIG. 5b is a cross sectional elevational view taken along line V—V of FIG. 5b.

Referring now to FIGS. 5a and 5b, a ball base 20 is shown in greater detail. A sturdy magnetic disc 50 forms the main body of the ball base 20. The disc 50 is an annular magnetic ring, forming a round central orifice 52. In this manner, the ball base 20 can be placed upon a round, steel hitch attachment ball, straddling the upper surface of the ball slightly. This allows the radial centerline of the central orifice 52 to mechanically align automatically with the vertical centerline of the ball. This allows a trailer hitch alignment device that is easily mountable and dismountable to most any conventional trailer hitch ball devices, is structurally rigid, allowing for straightforward or sideways direction of the hitch to be aligned, and is mechanically stable, allowing easy use free of breakage an failures that can result from weather and the like. Further, easy vertical alignment can also be achieved.

Alternately, a lower ball receiving bevel 53 can be formed along the lower surface of the base 20, thereby widening the outer diameter of the lower portion of the central orifice 52. This will allow for a certain amount of structural impingement to cause a frictional force to augment the magnetic attraction as the mounting force.

An upper support plate 54 is affixed to the upper surface of the disc 50. The plate 54 forms a mast attachment protrusion 56, extending as a lip outward at one end of the plate 54 past the outer circumference of the disc 50. A second mast receiving cavity 58 is formed within the protrusion 56 at an offset from the center of the disc 50. The cavity 58 is tapped and female-threaded for threadingly mating with the lower base mast 30, allowing for a screw-type connection for a firm, mechanical fit and assembly, or provided with a locking nut 59a and retention nut 59b for mechanically impinging the lower base mast 30 about the mast protrusion 56.

2. Operation of the Preferred

To use the trailer hitch alignment device of the present invention, the hitch alignment guide 12 and a ball target mast 14 are each magnetically fixed to the trailer hitch and ball, respectively. The vertically disposed, elongated alignment masts 16 are the placed as similar heights such that the terminating indica 37 at the top-most end of the upper telescoping mast 34 are at a similar horizontal plane. The driver of the towing vehicle uses masts 16 to align the vehicle in gross alignment with the trailer, and uses the spacing indicia 38 as visual references. By sighting the location of the most distant terminating indicia 37, as the user backs up the vehicle he or she will notice the perceived reference against the spacing indicia 38 changing upward along the shaft 36 as the vehicle approaches the trailer. Because the offset of the first cavity 42, relative to the centerline of the hitch base is similar to the offset of the second cavity 58 relative to the centerline of the hitch ball, once the masts 16 are lined up, so are the respective hitch components. Once alignment is accomplished, the driver then stops the towing vehicle, and detaches the hitch components from hitch. The hitch alignment guide 12 and ball target mast 13, with alignment mast 16 retracted, can be removed and stored.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A trailer hitch alignment device comprising:
   a hitch alignment guide comprised of a first vertically disposed, elongated alignment mast affixed to a hitch base;
   a lower base mast of a generally tubular, linearly elongated cylinder tapering in width slightly from the bottom to the top and forming an upper mast receiving conduit within;
   an upper telescoping mast slidably accommodated within the upper mast receiving conduit, allowing for the upper telescoping mast to be adjusted vertically relative to the lower base mast,
   a ball target mast comprised of a second vertically disposed, elongated alignment mast affixed to a ball base;
   a series of spacing indicia along an upper shaft of the upper telescoping mast, said spacing indicia being equally spaced apart along the outer surface of the shaft; and
   a terminating indica at the top-most end of the said telescoping mast.

2. The trailer hitch alignment device of claim 1, wherein said second vertically disposed, elongated alignment mast comprises:
   a second lower base mast of a generally tubular, linearly elongated cylinder tapering in width slightly from the bottom to the top and forming an upper mast receiving conduit within;
   a second upper telescoping mast slidably accommodated within the upper mast receiving conduit, allowing for the upper telescoping mast to be adjusted vertically relative to the lower base mast.

3. A trailer hitch alignment device comprising:
   a hitch alignment guide comprised of a first vertically disposed, elongated alignment mast affixed to a hitch base;
   a lower base mast of a generally tubular, linearly elongated cylinder tapering in width slightly from the bottom to the top and forming an upper mast receiving conduit within;
   an upper telescoping mast slidably accommodated within the upper mast receiving conduit, allowing for the upper telescoping mast to be adjusted vertically relative to the lower base mast,
   a ball target mast comprised of a second vertically disposed, elongated alignment mast affixed to a ball base;
   a series of spacing indicia along an upper shaft of the second upper telescoping mast, said spacing indicia being equally spaced apart along the outer surface of the shaft; and
   a terminating indica at the top-most end of the said second telescoping mast.

4. A trailer hitch alignment device comprising:
   a hitch alignment guide comprised of a first vertically disposed, elongated alignment mast affixed to a hitch alignment guide base, wherein said hitch alignment guide base is capable of being magnetically affixed flush to the lower surface of a hitch base member of a trailer hitch and wherein said first vertically disposed, elongated alignment mast comprises a lower base mast of a generally tubular, linearly elongated cylinder tapering in width slightly from the bottom to the top and forming an upper mast receiving conduit within and an upper telescoping mast slidably accommodated within the upper mast receiving conduit, allowing for the upper telescoping mast to be adjusted vertically relative to the lower base mast
   a ball target mast comprised of a second vertically disposed, elongated alignment mast affixed to a ball target mast base, wherein said ball target mast base is capable of being magnetically affixed to the top of a ball base member of a trailer hitch, wherein said hitch base further comprises:
   a sturdy magnetic disc;
   a first mast receiving cavity formed within said magnetic disc nearer an outer perimeter at an offset from a center of said disc.

5. The trailer hitch alignment device of claim 4, wherein said cavity is tapped and female-threaded for threadingly mating with the lower base mast allowing for a screw-type connection for a firm, mechanical fit and assembly.

6. A trailer hitch alignment device comprising:
   a hitch alignment guide comprised of a first vertically disposed, elongated alignment mast affixed to a hitch base having a lower base mast of a generally tubular, linearly elongated cylinder tapering in width slightly from the bottom to the top and forming an upper mast receiving conduit within and an upper telescoping mast slidably accommodated within the upper mast receiving conduit, allowing for the upper telescoping mast to be adjusted vertically relative to the lower base mast;
   a base hitch having a second vertically disposed, elongated alignment mast having a second lower base mast of a generally tubular, linearly elongated cylinder tapering in width slightly from the bottom to the top and forming an upper mast receiving conduit within and a second upper telescoping mast slidably accommodated within the upper mast receiving conduit, allowing for the upper telescoping mast to be adjusted vertically relative to the lower base mast; wherein said ball base comprises
   an annular magnetic ring, forming a round central orifice;
   an upper support plate affixed to the upper surface of the ring, said plate forming a mast attachment protrusion extending as a lip outward at one end of said plate past the outer circumference of the disc; and
   a second mast receiving cavity formed within said protrusion at an offset from the center of said ring.

7. The trailer hitch alignment device of claim 6, further comprising:
   a lower ball receiving bevel formed along the lower surface of the ring, thereby widening the outer diameter of the lower portion of the central orifice.

* * * * *